United States Patent Office 3,681,252
Patented Aug. 1, 1972

3,681,252
LIQUID LASER CONTAINING
CYCLOOCTATETRAENE
Charles Brecher, Little Neck, N.Y., Adam Heller, Sharon, Mass., and Romano Pappalardo, Westbury, N.Y., assignors to General Telephone & Electronics Laboratories Incorporated
Filed Oct. 29, 1970, Ser. No. 85,195
Int. Cl. F21k 2/02; H01s 3/00
U.S. Cl. 252—301.2 R 9 Claims

ABSTRACT OF THE DISCLOSURE

A dye laser utilizing an active material comprising a dye selected from the group consisting of Rhodamine 6G, Rhodamine S, Rhodamine B, Acridine Red, Kiton Red S and Uranine in solution with the triplet state quencher cyclooctatetraene. The resultant solution provides a dye laser having relatively long high energy output pulses.

BACKGROUND OF THE INVENTION

The invention relates to liquid lasers and in particular to lasers, generally known as dye lasers, which utilize an active material comprising an organic dye in a solvent.

The recognition that certain fluorescent organic dyes in solution may be stimulated to emit coherent radiation has led to the development of the dye laser. Stimulated emission is produced by excitation of the dye solution with electro-magnetic radiation of the proper wavelength and having an energy density which is above a critical level. Part of the radiation incident on the solution is absorbed by the dye molecules therein causing the energy level of the dye molecules to be raised from a ground state to an excited singlet state. When the concentration of molecules in the excited singlet state reaches a value called the critical inversion, coherent laser emission occurs. The emission results from a loss of energy as the dye molecules return to the ground state.

The properties of the dye laser make development of a practical laser of particular interest. In contrast with other lasers, the dye laser emits energy over a relatively broad portion of the electromagnetic spectrum. Dye lasers can then be tuned to emit energy at a specified wavelength within this broad portion of the spectrum by relatively simple techniques. The large number of organic dyes available permits use of a dye which will emit energy within a selected portion of the spectrum thereby allowing flexibility in the use of these lasers. Use of a liquid active medium permits the medium to be circulated thereby improving the optical properties of the medium and permitting rapid successive excitations of the laser.

Development of a practical dye laser has been impeded by a phenomenon known as early extinction or early termination. Theoretically, as long as the power level of the laser excitation source is above the critical level the laser will emit coherent radiation. However, it has been found that the laser output is actually quenched, or reduced to zero, while the power level of the excitation source is higher than the critical level; the duration of the output pulse being only a small fraction of the duration of the excitation pulse. This is referred to as early extinction or early termination.

The complex interactions which occur in the dye molecule after excitation and which give rise to early extinction of the laser output are not fully understood. At present it is known that dye molecules which have absorbed energy and been excited from the ground state to the excited singlet state may return directly to the ground state giving rise to stimulated emission which is governed by the lifetime of the dye molecule in the excited singlet state.

The dye molecule may return to the ground state by a second process involving intersystem crossing. In this process, the dye molecules relax to an intermediate energy level, or lowest triplet state, which lies between the excited singlet state and the ground state. The excited molecule will then return to the ground state, decaying in a process which may give rise to radiation known as phosphorescence and which does not contribute to the laser output.

The lifetime of the dye molecules in the lowest triplet state is generally much longer than the lifetime of the dye molecules in the excited singlet state. Under excitation, molecules tend to accumulate in this triplet state resulting in a depletion of the molecules in the ground state. Consequently fewer molecules are available for excitation.

The molecules in the lowest triplet state also may absorb energy and make a transition to a higher triplet state. The wavelength region of the strongest absorption of the dye molecules in the lowest triplet state may be near the wavelength of the laser emission. Thus dye molecules in the lowest triplet state tend to absorb the laser emission causing a large optical loss at the wavelengths for which laser emission is most probable.

To circumvent the problem of early extinction, a dye laser can be excited with an extremely short duration excitation pulse such as provided by a ruby laser. With a pulse of this duration, the laser threshold is reached and emission occurs before a significant number of molecules can accumulate in the triplet states. However, the laser output pulse is also of short duration.

To produce a dye laser capable of providing longer output-pulse duration or continuous operation requires the efficient quenching of the triplet state lifetime of the dye molecule. Triplet state quenchers for gases have been known for some time. One of these, molecular oxygen, has also been shown to act as a triplet state quencher for a dye. Molecular oxygen has been added to solution containing the dye Rhodamine 6G to produce an active medium for a dye laser. When this active medium is excited, an output pulse is obtained which has a longer duration than the laser output pulse obtained from a Rhodamine 6G solution without the addition of oxygen. However, while the duration of the output pulse has been increased by the addition of oxygen, the output pulse is still only a small fraction of the duration of the excitation pulse. Oxygen can also have a detrimental effect on certain dyes by efficiently quenching the excited singlet state as well as the triplet state lifetime and by causing dye photolysis. In addition, dissolved oxygen or other dissolved gases in solution may degrade the optical quality of the laser medium and cause dynamic losses which reduce the laser output power. Accordingly, we have invented an active medium for dye lasers wherein the problem of early extinction is reduced while distortion of the laser output beam is maintained relatively low.

SUMMARY OF THE INVENTION

This invention relates to dye lasers and in particular to dye lasers having an active material comprising an organic dye and a triplet state quencher.

The active material comprises a dye and liquid cyclooctatetraene, $C_8H_8$ (hereinafter designated COT) dissolved in a solvent. The dye is selected from the group consisting of Rhodamine 6G, Rhodamine B, Rhodamine S, Acridine Red, Kiton Red S and Uranine. The solvent can be an alcohol, typically ethanol or methanol. This liquid active material when excited by electromagnetic radiation emits a laser output pulse which has a longer duration and/or higher energy than the output pulse of a similar liquid active material without COT. Since COT is a liquid the distortion of the laser output is lower than the distortion which occurs when the active medium utilizes a dissolved gas such as $O_2$ as a triplet-state quencher.

Further features and advantages of the present invention will become more readily apparent from the following detailed description of specific embodiments thereof.

DESCRIPTION OF THE PREFERRED EMBODIMENT

The present active medium for a dye laser contains a dye and the triplet state quencher, COT, dissolved in a solvent. The dye is selected from a group consisting of Rhodamine 6G, Rhodamine S, Rhodamine B, Acridine Red, Kiton Red S and Uranine. The solvent is typically an alcohol such as ethanol or methanol.

Figure 1:
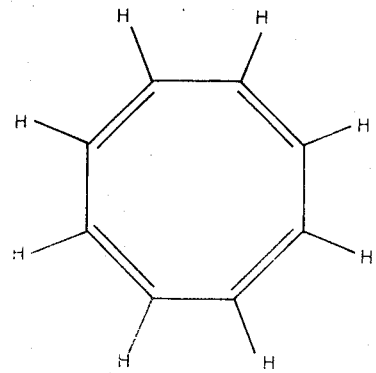
FIG. 1 shows the chemical structure of cyclooctatetraene.

COT is an unsaturated cyclic hydrocarbon having the general formula $C_8H_8$ with molecular weight equal to 104 and structure as given in FIG. 1. A detailed analysis and description of COT may be found in an article entitled "The Chemistry of Eight-Membered Carbocycles" by L. E. Craig, which appeared at 49 Chemical Review 103 (1951).

COT may be synthesized using a method described in an article entitled "Cyclic Polyolefins. II. Synthesis of Cyclooctatetraene from Chloroprene" by A. C. Cope and W. T. Bailey which appeared at 70 Journal of the American Chemical Society 2305 (1948). Briefly, chloroprene is heated in the presence of phenothiazine and converted into a mixture of dimers. The eight-membered ring dimer is separated from the six-membered ring dimer by fractional distillation, treatment of the eight-membered ring dimer with an alcoholic alkali to remove a dimer containing reactive chlorine, and refractionation. Dichloro-1,5-cyclooctadiene thus produced is then dehalogenated by reaction with sodium in liquid ammonia which yields 1,5-cyclooctadiene. The 1,5-cyclooctadiene is reacted with two molar equivalents of N-bromosuccinimide in the presence of benzoyl peroxide to give a dibromo compound which when treated with an excess of dimethylamine produces a bis-(dimethylamino)-cyclooctadiene. The latter compound is then converted into a dimethiodide which with silver hydroxide yields a quaternary base. Slow distillation of the latter yields cyclooctatetraene.

In the preparation of the dye laser medium of this invention a solution having a desired dye concentration is produced by stirring a measured amount of dye in a solvent until the dye is fully dissolved. COT is then added to the dye solution. For example, to obtain a solution having a dye concentration of approximately $5 \times 10^{-5}$ moles per liter of solution (m./l.) of the dye Rhodamine 6G and approximately $5 \times 10^{-3}$ m./l. of COT (Molecular Weight equal to 104), 25 milligrams of Rhodamine 6G are dissolved in 1 liter of ethanol. When the dye is fully dissolved 0.5 cubic centimeter of COT are added to produce the final solution. By similar methods, dye laser media having various concentrations of dyes with various concentrations of COT can be made.

Figure 2:
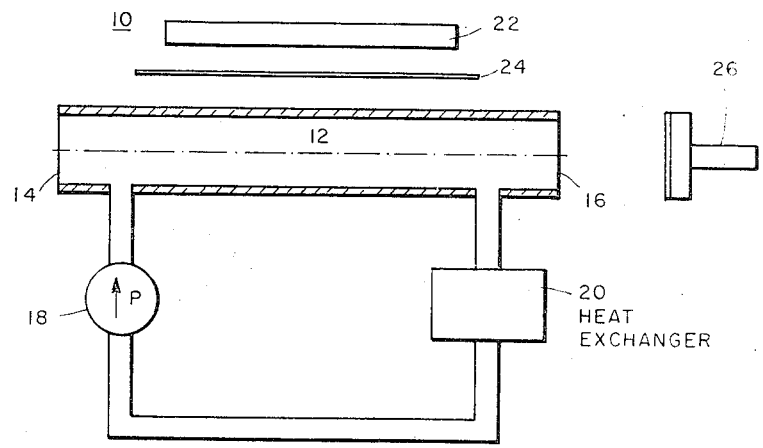
FIG. 2 is a schematic diagram of the dye laser of this invention.

A dye laser utilizing the active medium prepared in the above-described manner is shown in FIG. 2. Laser 10 is shown comprising a hollow cylindrical cell 12 which may be made of any material which transmits light at the excitation wavelength of the active material, typically quartz or Pyrex. The ends of cell 12 are sealed by optically flat, parallel end faces 14 and 16 having reflective coatings thereon; one, for example 14, being totally reflective while the other 16, being only partially reflective. A typical cell is three inches long and has an inside diameter of one-eighth (⅛) inch.

The laser is filled with the active material. A pump 18 is provided to circulate the active material within the laser and a heat exchanger 20 may be provided to cool the material as it leaves the cell. A flash lamp 22, coupled to an external trigger circuit (not shown) provides excitation energy for the laser.

In operation, the dye laser solution flows through cell 12 wherein it is excited by absorbing energy emitted by flash lamp 22. The absorbed energy raises the dye molecules from the ground state to the excited singlet state. When critical inversion is reached laser emission occurs and the molecules lose energy and return to the ground state. Quenching of the triplet state of the dye molecule is believed to occur by the following energy-exchange process: Dye molecules in the lowest triplet state collide with molecules of COT whereby energy is transferred from the dye molecules to the COT molecules. The COT molecules are thereby raised to an excited state while the dye molecules return to the ground state where they are available for reexcitation. The COT molecules thereafter lose energy and return to a lower energy level. However this process does not interfere with the laser emission.

The laser may also have a filter 24 positioned between flash lamp 22 and cell 12. Filter 24 is designed to block the ultraviolet (uv) component (wavelengths below 4000 A.) of the excitation energy and transmit the remaining energy. Experiments have shown that the laser pulse duration and output power are increased when the excitation energy is filtered in this manner. It is believed that energy in the ultraviolet region absorbed by the COT molecules raises their energy from the ground state to the excited singlet state where they are no longer available for quenching the triplet state of the dye molecules. The elimination of the uv radiation effects a relative increase in the concentration of COT molecules in the ground state resulting in more efficient quenching.

Experiments were carried out utilizing the dye laser medium in a system comprising a laser similar to that shown in FIG. 2. For the purpose of these experiments a photodiode 26 is positioned in the path of the laser output beam. The photodiode output is applied to an oscilloscope for measurement of the energy and duration of the laser output beam. Table I shows the improvement in lasing parameters due to the addition of COT to dye solutions.

The output of the dye laser was compared, for various concentrations of COT, with air-equilibrium and in some instances with oxygen-saturated solutions for a constant concentration of dye. The experiments were carried out as follows: A dye solution was prepared. The oxygen content of this solution is the amount of air in equilibrium with the solvent at ambient temperature and pressure and is referred to as the "air equilibrium" solution. The laser was excited and the results indicated in the "air equilibrium" column in Table I. After excitation, certain of the solutions were saturated with oxygen at 3 p.s.i. above atmospheric pressure. This oxygen dye solution was excited and the results indicated in the "oxygen" column in Table I. The oxygen was then removed from all the solutions by saturation with nitrogen gas. COT was then added in various concentrations and the laser was again excited. The results at certain values of COT concentrations are given in the COT concentration columns in Table I. For each test run, the oscilloscope settings were maintained constant. When a laser output occurred an oscilloscope trace was produced and recorded. The area under these curves provides a quantitative comparison of the output energy of the laser under the different test conditions. These are the values recorded in the output energy lines of Table I.

The improved laser output brought about by the addition of COT to the dye solution is evident from Table I. Thus, the addition of COT to a dye solution of Rhodamine 6G increased the energy of the laser output more than 20 times over the air equilibrium dye laser solution and more than 10 times over the oxygen-saturated solution while the duration of the ouput pulse approximately doubled.

Table II shows the results of experiments with dye laser media having various concentrations of dye and COT.

sisting of Rhodamine 6G, Rhodamine B, Rhodamine S, Acridine Red, Kiton Red S and Uranine.

TABLE I.—IMPROVEMENT IN LASING PARAMETERS DUE TO COT

| Dye | Dye concentration (m./l.) | Air equilibrium | Oxygen | COT concentration (m./l.) | | |
|---|---|---|---|---|---|---|
| Rhodamine 6G: | $5 \times 10^{-5}$ | | | $5 \times 10^{-3}$ | $2.5 \times 10^{-2}$ | $6.5 \times 10^{-2}$ |
| Output energy [b] | | 1.74 | 4.44 | 44 | 48.5 | 26 |
| Duration (μsec.) | | 75 | 58 | 120 | 124 | 104 |
| Rhodamine B: | $5 \times 10^{-5}$ | | | $0.7 \times 10^{-2}$ | $1.4 \times 10^{-2}$ | |
| Output energy [b] | | 3 | 18 | 42 | 58.9 | |
| Duration (μsec.) | | 10 | 18 | 21 | 24 | |
| Kiton Red S: | $1.6 \times 10^{-4}$ | | | $3.3 \times 10^{-2}$ | | |
| Output energy [b] | | [a] 0 | [d] | [c] | | |
| Duration (μsec.) | | [a] 0 | [d] | 44 | | |
| Acridine Red: | $1.0 \times 10^{-4}$ | | | $1.32 \times 10^{-2}$ | | |
| Output energy [b] | | [a] 0 | [a] 0 | [c] | | |
| Duration (μsec.) | | [a] 0 | [a] 0 | 42 | | |
| Uranine: | $5 \times 10^{-5}$ | | | $5 \times 10^{-3}$ | | |
| Output energy [b] | | [a] 0 | [d] | 6.3 | | |
| Duration (μsec.) | | [a] 0 | [d] | 14 | | |

[a] Lasing does not occur.
[b] Arbitrary units.
[c] Output energy not recorded, lasing occurs.
[d] Test not run.

TABLE II.—COMPARISON OF LASER EXCITATION PULSE AND OUTPUT PULSE DURATIONS FOR VARIOUS CONCENTRATIONS OF DYE AND COT

| Dye | Dye concentration (m./l.) | COT concentration (m./l.) | Excitation pulse duration (μsec.) | Laser output pulse duration (μsec.) |
|---|---|---|---|---|
| Kiton Red S | $1.6 \times 10^{-4}$ | | 250 | [a] |
| | $1.6 \times 10^{-4}$ | $3.3 \times 10^{-2}$ | 250 | 44 |
| | $1.05 \times 10^{-4}$ | $2.0 \times 10^{-2}$ | 220 | 20 |
| | $2.4 \times 10^{-4}$ | $7.0 \times 10^{-2}$ | 220 | 38 |
| Acridine Red | $1.0 \times 10^{-4}$ | | 250 | [a] |
| | $1.0 \times 10^{-4}$ | $0.66 \times 10^{-2}$ | 220 | 40 |
| | $1.0 \times 10^{-4}$ | $1.32 \times 10^{-2}$ | 250 | 42 |
| | $1.0 \times 10^{-4}$ | $2.3 \times 10^{-2}$ | 220 | 30 |
| Rhodamine S | $7.7 \times 10^{-5}$ | $0.5 \times 10^{-2}$ | 220 | 40 |
| | $7.7 \times 10^{-5}$ | $3.5 \times 10^{-2}$ | 250 | 48 |
| | $9.6 \times 10^{-5}$ | $3.5 \times 10^{-2}$ | 250 | 112 |
| | $1.4 \times 10^{-4}$ | $4.4 \times 10^{-2}$ | 250 | 115 |
| Rhodamine B | $5.7 \times 10^{-5}$ | | 250 | [a] |
| | $5.7 \times 10^{-5}$ | $0.5 \times 10^{-2}$ | 60 | 20 |
| | $5.0 \times 10^{-5}$ | $1.0 \times 10^{-2}$ | 180 | 50 |
| | $6.0 \times 10^{-5}$ | $5.5 \times 10^{-3}$ | 250 | 136 |
| Uranine | $5.0 \times 10^{-5}$ | | 60 | [a] |
| | $5.0 \times 10^{-5}$ | $5.0 \times 10^{-3}$ | 60 | 14 |
| | $5.0 \times 10^{-5}$ | $1 \times 10^{-2}$ | 60 | 26 |
| | $1.0 \times 10^{-4}$ | $3 \times 10^{-2}$ | 80 | 26 |
| | $1.1 \times 10^{-4}$ | $5 \times 10^{-2}$ | 95 | 14 |
| Rhodamine 6G | $5.0 \times 10^{-5}$ | $5 \times 10^{-5}$ | 60 | 5 |
| | $2.0 \times 10^{-5}$ | $3.5 \times 10^{-2}$ | 250 | 120 |
| | $8.0 \times 10^{-5}$ | $4.5 \times 10^{-2}$ | 250 | 140 |
| | $5.0 \times 10^{-5}$ | $6 \times 10^{-2}$ | 900 | 120 |

[a] Lasing does not occur.

It is preferred that the dye concentration be in the range of $10^{-6}$ to $10^{-3}$ m./l. Below a dye concentration of about $10^{-6}$ m./l. the gain in the dye medium is insufficient to overcome the losses of the laser and no useful laser output is obtained. At dye concentrations above about $10^{-3}$ m./l. sufficient energy cannot be pumped into the laser to cause a laser output.

For each dye the concentration of COT in solution is chosen so that the laser output is enhanced. Thus the dye Rhodamine 6G requires a minimum concentration of about $5 \times 10^{-5}$ m./l. while the dye Kiton Red S requires a minimum COT concentration of about $2 \times 10^{-2}$ m./l. As the COT concentration is increased there generally appears to be an improvement in the laser output up to a concentration of about $5 \times 10^{-2}$ m./l. Above this concentration there is a degradation of the laser output beam, however, a laser output can be obtained with the concentration of COT at the limit of solubility of the COT in the solution.

What is claimed is:

1. An active material for a liquid laser, which comprises a solvent in which is dissolved cyclooctatetraene and a solution containing a dye selected from the group con- 2. The active material of claim 1 wherein the concentration of said dye is in the range $10^{-6}$ m./l. of solution to $10^{-3}$ m./l. of solution.

3. The active material of claim 2 wherein the concentration of cyclooctatetraene is at least sufficient to enhance the laser output over that obtained without cyclooctatetraene.

4. The active material of claim 1 wherein the dye is Rhodamine 6G having a concentration in the range $2 \times 10^{-5}$ m./l. of solution to $8 \times 10^{-5}$ m./l. of solution and the concentration of cyclooctatetraene is in the range $5 \times 10^{-5}$ m./l. of solution to $6 \times 10^{-2}$ m./l. of solution.

5. The active material of claim 1 wherein the dye is Rhodamine B having a concentration in the range $6 \times 10^{-5}$ m./l. of solution to $5 \times 10^{-5}$ m./l. of solution and the concentration of cyclooctatetraene is in the range $5.5 \times 10^{-2}$ m./l. of solution to $0.5 \times 10^{-2}$ m./l. of solution.

6. The active material of claim 1 wherein the dye is Uranine having a concentration in the range $1.1 \times 10^{-4}$ m./l. of solution to $5 \times 10^{-5}$ m./l. of solution and the concentration of cyclooctatetraene is in the range $5 \times 10^{-2}$ m./l. of solution to $5 \times 10^{-3}$ m./l. of solution.

7. The active material of claim 1 wherein the dye is Rhodamine S having a concentration in the range $9.6 \times 10^{-5}$ m./l. of solution to $1.4 \times 10^{-4}$ m./l. of solution and the concentration of cyclooctatetraene is in the range $4.4 \times 10^{-2}$ m./l. of solution to $0.5 \times 10^{-2}$ m./l. of solution.

8. The active material of claim 1 wherein the dye is Kiton Red S having a concentration in the range $2.4 \times 10^{-4}$ m./l. of solution to $1.05 \times 10^{-4}$ m./l. of solution and the concentration of cyclooctatetraene is in the range $7 \times 10^{-2}$ m./l. of solution to $2 \times 10^{-2}$ m./l. of solution.

9. The active material of claim 1 wherein the dye is Acridine Red having a concentration in the range $1.0 \times 10^{-4}$ m./l. of solution and the concentration of cyclooctatetraene is in the range $2.3 \times 10^{-2}$ m./l. of solution through $0.66 \times 10^{-2}$ m./l. of solution.

References Cited

UNITED STATES PATENTS 3,541,470  11/1970  Lankard et al. ___ 252—301.2 RX

OTHER REFERENCES

Pappalardo et al.: Applied Physics Letters, 16, 267 (1970).

ROBERT F. BURNETT, Primary Examiner

L. T. KENDELL, Assistant Examiner

U.S. Cl. X.R.

330—4.3; 331—94.5